US012241305B2

(12) United States Patent
Fleury et al.

(10) Patent No.: US 12,241,305 B2
(45) Date of Patent: Mar. 4, 2025

(54) INSULATED ASSEMBLIES AND METHODS OF FORMING AND USING SAME

(71) Applicant: The Regents of the University of Colorado, a body corporate, Denver, CO (US)

(72) Inventors: Blaise Fleury, Boulder, CO (US); Ivan I. Smalyukh, Boulder, CO (US); Jan Bart ten Hove, Boulder, CO (US); Vladyslav Cherpak, Westminster, CO (US); Eldho Abraham, Boulder, CO (US); Taewoo Lee, Broomfield, CO (US); Bohdan Senyuk, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/548,127

(22) Filed: Dec. 10, 2021

(65) Prior Publication Data

US 2022/0186550 A1 Jun. 16, 2022

Related U.S. Application Data

(60) Provisional application No. 63/123,926, filed on Dec. 10, 2020.

(51) Int. Cl.
*E06B 3/67* (2006.01)
*E06B 3/673* (2006.01)

(52) U.S. Cl.
CPC ........ *E06B 3/6715* (2013.01); *E06B 3/67326* (2013.01)

(58) Field of Classification Search
CPC ............ E06B 3/2632; E06B 3/64; E06B 3/66; E06B 3/6608; E06B 3/66304; E06B 3/66233; E06B 3/66333; E06B 3/67; E06B 3/6715; E06B 3/6722; E06B 3/677; E06B 3/67326; E06B 2003/23621; E06B 2003/26323; E06B 2003/26325; E06B 2003/26327; E06B 2003/26329; E06B 2003/2633
See application file for complete search history.

(56) References Cited

U.S. PATENT DOCUMENTS 5,698,277 A * 12/1997 Schueller ............ E06B 3/66333 428/920
2006/0090834 A1* 5/2006 Huang .................... B32B 27/36 156/107
2009/0068384 A1* 3/2009 Seth .................. B32B 17/10055 428/34

(Continued)

FOREIGN PATENT DOCUMENTS

WO 2019241604 A1 6/2019

*Primary Examiner* — Kyle J. Walraed-Sullivan
(74) *Attorney, Agent, or Firm* — Snell & Wilmer L.L.P.

(57) ABSTRACT

Insulated assemblies, insulation units including an assembly, and methods of forming the assemblies and units are disclosed. Exemplary assemblies include a first pane of material, a second pane of material, and one or more monolithic insulating layers interposed between the first pane of material and the second pane of material. The insulating layer can exhibit a thermal conductivity less than 26 mW/(K.m).

20 Claims, 17 Drawing Sheets

(56) References Cited

U.S. PATENT DOCUMENTS

| | | | | |
|---|---|---|---|---|
| 2015/0075902 | A1* | 3/2015 | Schreiber | E06B 3/67304 181/294 |
| 2015/0315779 | A1* | 11/2015 | Baily | B32B 25/04 29/469 |
| 2015/0360446 | A1* | 12/2015 | Schwankhaus | B32B 17/10761 264/261 |
| 2016/0096344 | A1* | 4/2016 | Kurihara | B32B 17/10532 428/34 |
| 2016/0319588 | A1* | 11/2016 | Samanta | C01B 33/159 |
| 2018/0264784 | A1* | 9/2018 | Murofushi | B32B 17/10633 |
| 2019/0048652 | A1* | 2/2019 | Weinryb | E06B 3/6715 |
| 2019/0055373 | A1 | 2/2019 | Hess et al. | |
| 2019/0333490 | A1* | 10/2019 | Wang | C01B 33/1585 |
| 2020/0040570 | A1* | 2/2020 | Cook | B32B 17/10697 |
| 2022/0042369 | A1* | 2/2022 | Burrows | E06B 3/6612 |

* cited by examiner

| U-value (Air) Btu/(h·ft2·°F) | Air | 0.312 | 0.220 | 0.200 | 0.155 |
|---|---|---|---|---|---|
| R-Value | Air | 3.21 | 4.55 | 4.99 | 6.44 |
| | Argon | 3.49 | 5.45 | 5.27 | 7.44 |
| | Krypton | 3.63 | 5.91 | 5.49 | 7.95 |

| | | |
|---|---|---|
| U-value BTU/(h·ft²·°F) | 0.229 | 0.203 |
| R-value | 4.37 | 4.93 |
| R-value (Argon) | 4.70 | 5.69 |
| R-value (Krypton) | 5.21 | 7.42 |

| | | | | |
|---|---|---|---|---|
| U-value BTU/(h·ft$^2$·°F) | 0.184 | 0.147 | 0.093 | 0.077 |
| R-value | 5.43 | 6.82 | 10.71 | 13.02 |
| R-value (Argon) | 5.99 | 8.10 | 11.29 | 13.68 |
| R-value (Krypton) | 6.48 | 8.97 | 11.93 | 14.86 |

INSULATED ASSEMBLIES AND METHODS OF FORMING AND USING SAME

CROSS-REFERENCE TO RELATED APPLICATION

This application claims priority to U.S. Provisional Application No. 63/123,926, filed Dec. 10, 2020, and entitled "INSULATED ASSEMBLIES AND METHODS OF FORMING AND USING SAME," the disclosure of which is hereby incorporated by reference in its entirety.

FEDERALLY-SPONSORED RESEARCH

This invention was made with government support under grant number DE-AR0000743 awarded by the U.S. Department of Energy. The government has certain rights in the invention.

FIELD OF THE DISCLOSURE

The present disclosure generally relates to insulated assemblies and methods of forming the insulated assemblies. More particularly, examples of the disclosure relate to insulated assemblies that include an insulating layer and to methods of forming and using the insulated assemblies.

BACKGROUND OF THE DISCLOSURE

Insulated assemblies, such as insulated glass units (IGUs), can include two panes of glass and air or other gas sealed between the two panes of glass. Such IGUs can work well for some applications. However, it may be desirable to obtain better insulating properties (e.g., lower thermal conductivity) than what can be obtained using glass panes and air or other gas. Accordingly, improved materials, insulated assemblies, and methods of forming the assemblies are desired.

Any discussion of problems and solutions set forth in this section has been included in this disclosure solely for the purpose of providing a context for the present disclosure and should not be taken as an admission that any or all of the discussion was known at the time the invention was made.

SUMMARY OF THE DISCLOSURE

This summary is provided to introduce a selection of concepts. This summary is not intended to necessarily identify key features or essential features of the claimed subject matter, nor is it intended to be used to limit the scope of the claimed subject matter.

Various embodiments of the present disclosure relate to insulated assemblies and to methods of forming the insulated assemblies. As discussed in more detail below, exemplary insulated assemblies can exhibit relatively low thermal conductivity and desired transmission of light. Further, the insulated assemblies can be relatively easy and inexpensive to manufacture. In addition, insulated assemblies can include an insulating layer that is relatively lightweight—e.g., due to the insulating layer's high porosity. The relatively light weight can be advantageous for cases where, for example, the building envelope cannot support the weight of a regular triple-pane IGU. By swapping a traditional mid pane of glass with an insulating layer as described herein, an overall weight of an (e.g., triple-pane) IGU can be decreased, while thermal and/or optical performance can be improved.

In accordance with exemplary embodiments of the disclosure, an insulated assembly includes a first pane of material, a second pane of material, and one or more monolithic insulating layers interposed between the first pane of material and the second pane of material, the insulating layer having a thermal conductivity less than 26 mW/(K.m), less than 25 mW/(K.m), less than 20 mW/(K.m), less than 15 mW/(K.m), less than 12 mW/(K.m), or less than 10 mW/(K.m). The material can include, for example, glass, plastic, combinations thereof, or the like. At least one of the one or more monolithic insulating layers, also referred to herein as mid-layers, can be a self-supporting layer. Exemplary insulated assemblies can include direct contacts between the monolithic insulating layers and at least one or more of the first pane of material and the second pane of material. Exemplary insulated assemblies can include a gap between at least one of the one or more monolithic insulating layers and at least one of the first pane of material and the second pane of material. The gap, also referred to herein as an airgap, can be filled with air, other gas or be under vacuum. The gas can include, for example, krypton, argon, combinations thereof, or the like. Exemplary insulated assemblies can include two or more monolithic insulating layers and a gap between at least two of the two or more monolithic insulating layers. Insulated assemblies in accordance with these embodiments can include three or more panes of material. In accordance with further examples of the disclosure, a refractive index of at least one of the one or more monolithic insulating layers is less than 1.5, less than 1.25, less than 1.1, or between about 1 and about 1.1. The transparency of the one or more insulating materials can vary according to application. In accordance with some examples of the disclosure, at least one of the one or more monolithic insulating layers is greater than 90% transparent to light in the visible spectrum. For example, a transmission of light in the visible spectrum is greater than 66% or greater than 73% for the assembly. In some cases, the transmission of light through the insulated assembly can be less than 73%—e.g., when the insulated assembly includes one or more coatings, such as those described below. A haze value of the assembly can be less than 50%, 20%, 5%, 4%, 3%, or 2%. In some cases, such as when the insulated assembly is used for privacy windows, greenhouse windows, or the like, the haze value may be relatively high—e.g., greater than 5%. When used as a traditional window, the haze value may desirably be less than 5%, 4%, 3%, or 2%. In accordance with further examples, a low-emissivity coating can be applied on one or at least one of the first pane of material and the second pane of material. In accordance with yet further examples, an active layer designed to control solar heat gain can be applied on one or at least one of the first pane of material and the second pane of material. As described below, for insulative assemblies yielding high thermal insulation, in accordance with examples of the disclosure, a low-emissivity coating can be omitted as it may not further increase thermal insulation. This low-E coating omission can yield even more transparent assemblies. In accordance with yet further examples, at least one of the one or more monolithic insulating layers comprises a porous material. In at least some cases, at least one of the one or more monolithic insulating layers includes mesoporous material exhibiting pore sizes less than 100 nanometers, less than 50 nm or between about 1 nm and 30 nm. In accordance with further examples, at least one of the one or more monolithic insulating layers comprises an aerogel. As illustrated below, insulated assemblies can also include one or more spacers between the first pane of material and the second pane of material. Additionally or alternatively, insulated assemblies can include a frame about a perimeter of the first pane of material and the second pane of material. Insulated assemblies can also include sealant between the first pane of material and the second pane of material.

In accordance with additional embodiments of the disclosure, a method of forming an insulated assembly includes providing a first pane of material, forming a first monolithic insulating layer on a surface of the first pane of material, and providing a second pane of material, wherein the insulated assembly comprises the first monolithic insulating layer between the first pane of material and the second pane of material, and wherein a thermal conductivity of the insulated assembly is less than 26 mW/(K.m), less than 25 mW/(K.m), less than 20 mW/(K.m), less than 15 mW/(K.m), less than 12 mW/(K.m), or less than 10 mW/(K.m). The step of forming a first monolithic insulating layer can include applying coupling molecules, discussed below, on the surface of the first pane of material. The method can further include a step of drying a solution using, for example, one or more of critical point drying and supercritical fluid extraction. The method can further include a step of treating a surface of the first pane of material prior to forming the first monolithic insulating layer on the surface of the first pane of material. The step of treating can include, but is not limited to, plasma treatment, etching using a basic solution, etching using an acidic solution, or any combination of the above. In accordance with examples of the disclosure, the method can include a step of forming a second monolithic insulating layer on a surface of the second pane of material. The method can include a step of providing one or more spacers to form a gap.

In accordance with various examples noted herein, the insulated assembly can include coupling molecules on one or more of the surface of the first pane of material and the surface of the second pane of material and/or the method can include providing coupling molecules on one or more of the surface of the first pane of material and the surface of the second pane of material. Examples of suitable coupling molecules include, but are not limited to, silane or silanol derivatives containing one or more reactive groups, such as amines, epoxides, carboxylic acids, cyanates or isocyanates; polymers bearing cationic, anionic, or zwitterionic functional groups, including linear as well as dendritic polymers. The coupling molecules can be applied using a vapor deposition process or by the application of a solution including the coupling molecules.

In accordance with further examples of the disclosure, an insulation unit includes an insulated assembly as described herein or formed according to a method described herein.

These and other embodiments will become readily apparent to those skilled in the art from the following detailed description of certain embodiments having reference to the figures; the disclosure not being limited to any particular embodiment(s) disclosed.

BRIEF DESCRIPTION OF THE DRAWING FIGURES

A more complete understanding of the embodiments of the present disclosure may be derived by referring to the detailed description and claims when considered in connection with the following illustrative figures.

Figure 5:
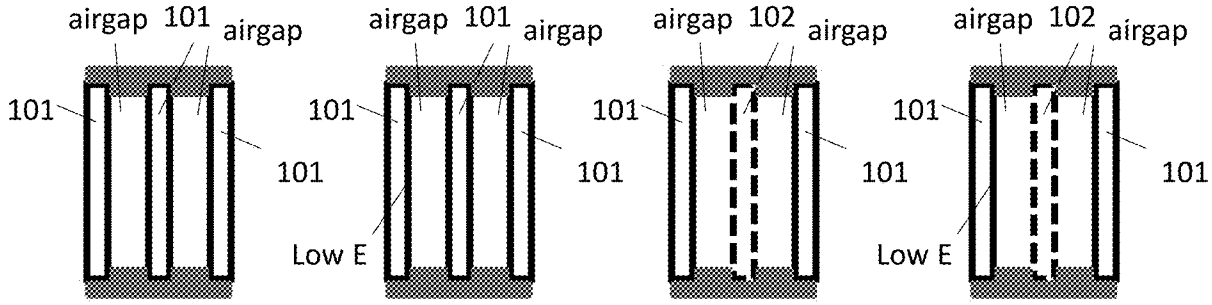

FIG. 5 illustrates triple pane assemblies comprising two glass panes (101) 3 mm thick on the outer part of the structure; one of them may have a low emissivity coating (Low E) and one middle pane from either a glass pane (101) or an insulating mid-layer (102) in between whose thickness is 3.2 mm. The table regroups calculated U values (BTU/sq ft/° F./h) and R values for each assembly when the airgap is filled with air or other gas as noted. The airgap is 12.7 mm (½ inch) thick. The thermal conductivity of the mid-layer (102) is 10 mW(K.m). The total area of the prototype is 1 $m^2$.

Figure 6:
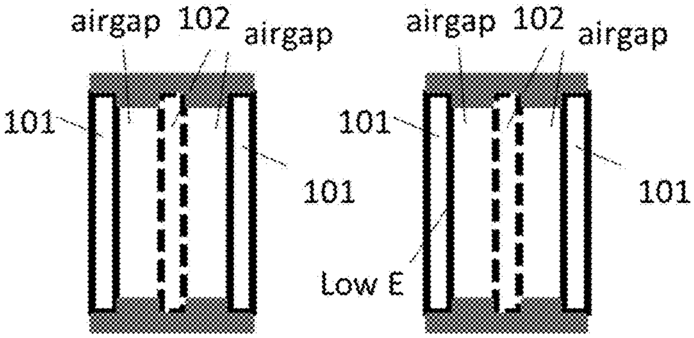

FIG. 6 illustrates thin triple pane assemblies comprising two glass panes (101) 3 mm thick on the outer part of the structure, one of them may have a low emissivity coating (Low E) and one middle pane from an insulating mid-layer (102) in between whose thickness is 3.2 mm. The table regroups calculated U values (BTU/sq ft/° F./h) and R values for each assembly when the airgap is filled with air or other gas specified in parentheses. The airgap is 6 mm thick. The thermal conductivity of the mid-layer (102) is 10 mW(K.m). The total area of the prototype is 1 $m^2$.

Figure 7:
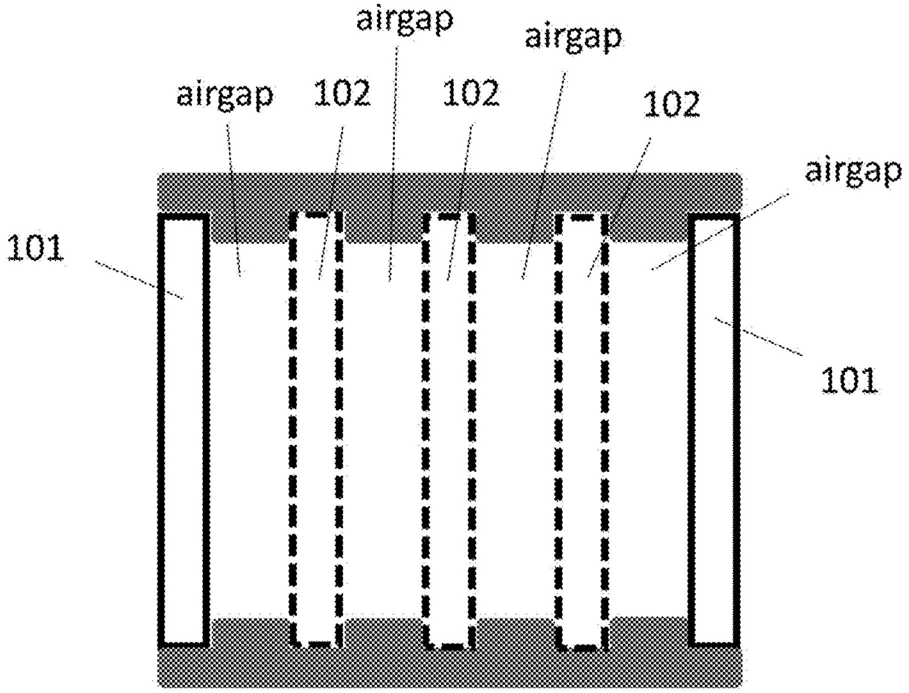

FIG. 7 illustrates a quintuple pane assembly comprising two glass panes (101) on the outer part of the structure and three thermally insulating mid-layers (102). The airgaps between each pane are several mm thick (~3-12 mm). The overall stack is held in place by spacers, adhesive and sealant (shaded).

Figure 8:
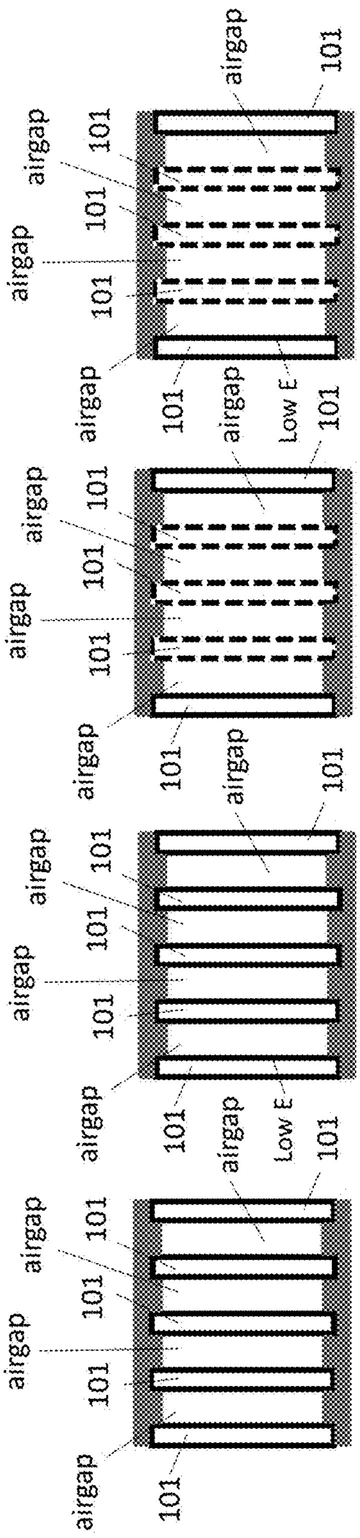

FIG. 8 illustrates quintuple pane assemblies comprising two glass panes (101) 3 mm thick on the outer part of the structure; one of them may have a low emissivity coating (Low E) and three middle panes from either a glass pane (101) or an insulating mid-layer (102) in between whose thickness is 3.2 mm. The table regroups calculated U values (BTU/sq ft/° F./h) and R values for each assembly when the airgaps are filled with air or other gas specified in parenthesis. The airgaps are 12.7 mm (½ inch) thick. The thermal conductivity of the mid-layer (102) is 10 mW(K.m). The total area of the prototype is 1 $m^2$.

Figure 9:
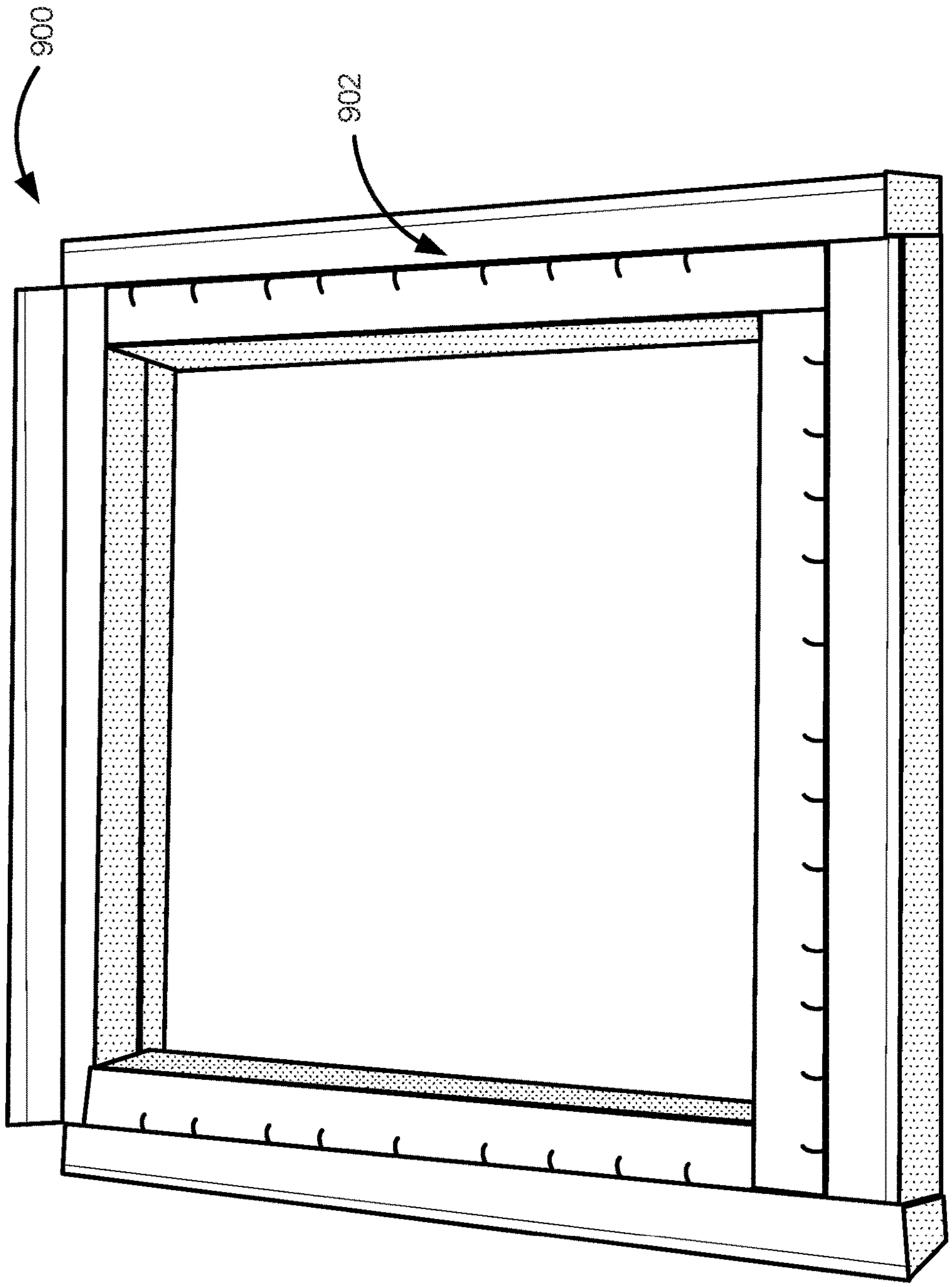

FIG. 9 illustrates a picture of a prototype triple pane assembly with one mid-layer.

Figure 10:
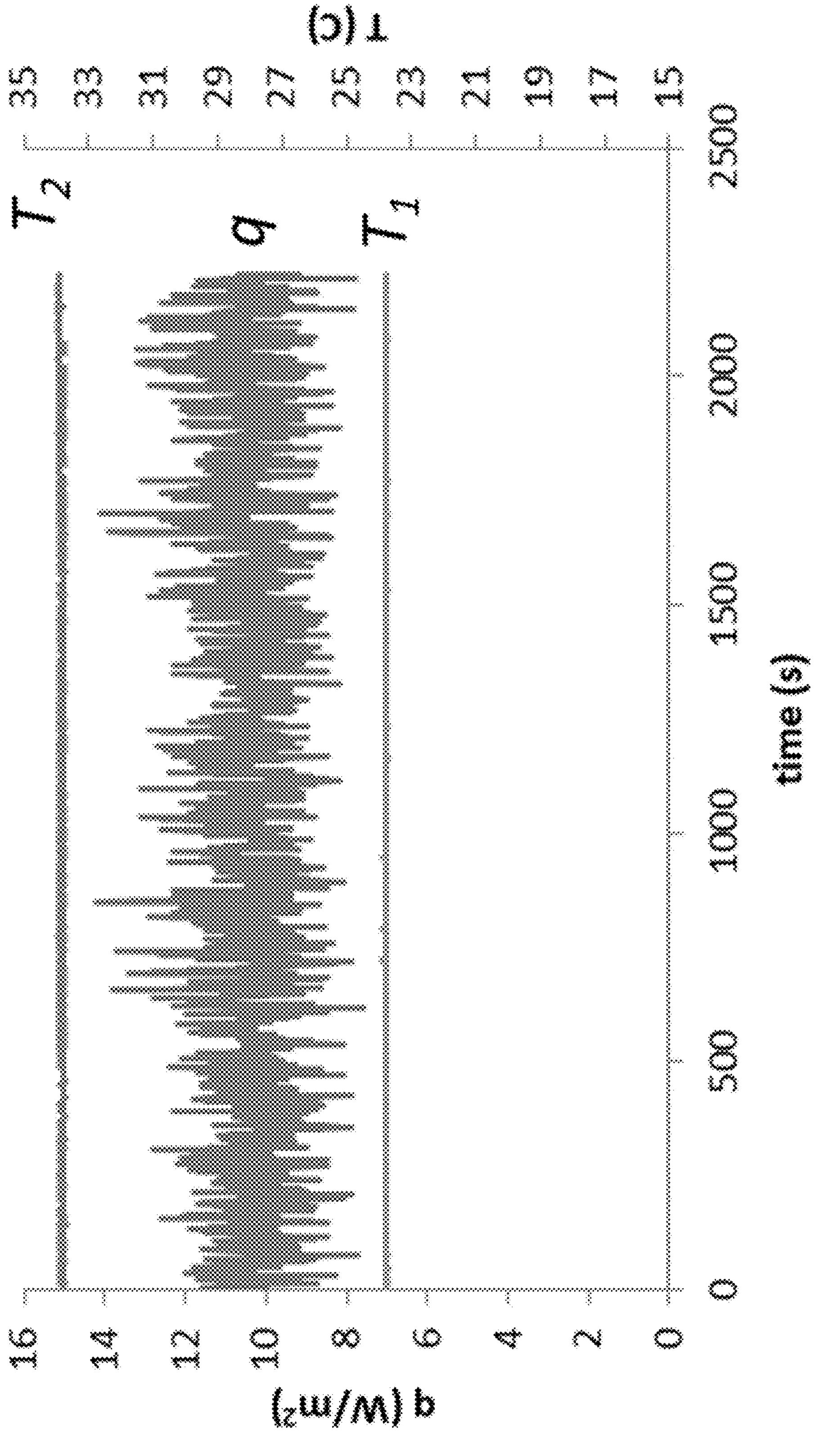

FIG. 10 illustrates flow measured across our prototype placed under a temperature gradient. From this ΔT, we can obtain a U-value of 0.185 BTU/sf/F/h.

Figure 11:
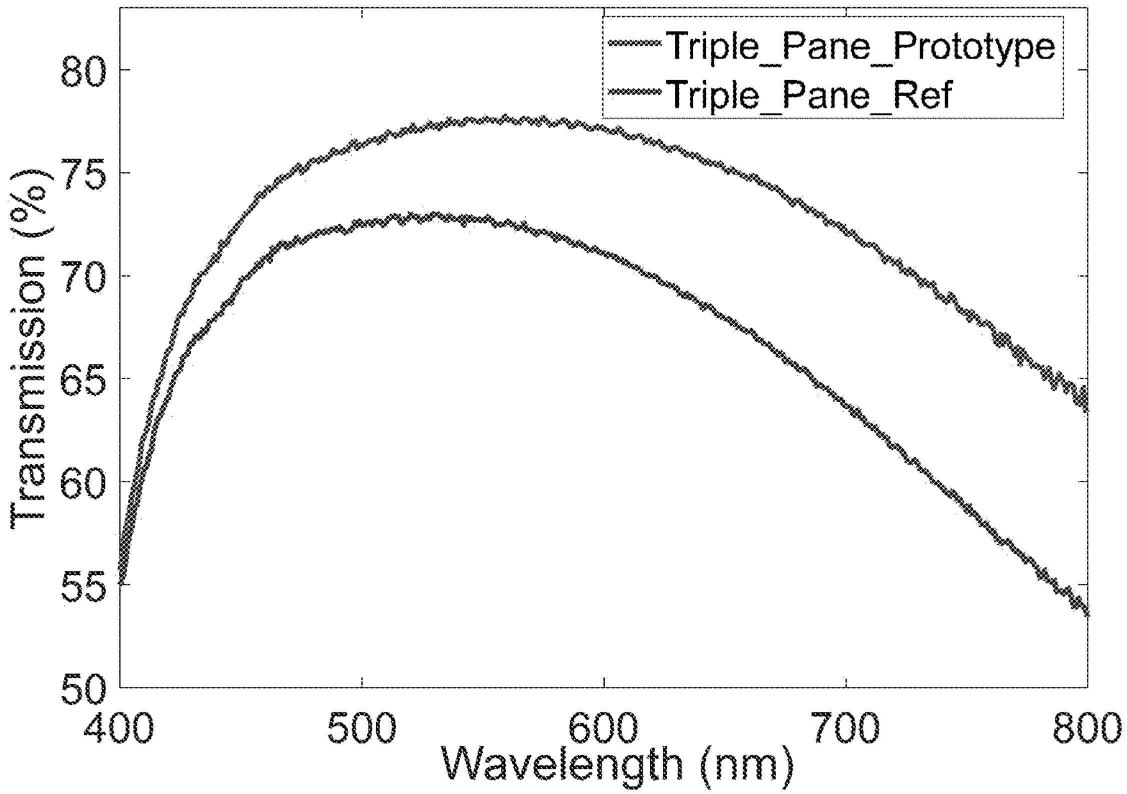

FIG. 11 illustrates transmission spectrum of a triple pane prototype picture in FIG. 9 (top line) and for a standard triple pane IGU with three panes of glass ⅛" thick with ½" airgaps (bottom line). One of the glass panes has a low-E coating. Average transmission is 73% for the triple pane prototype and 67% for the reference.

Figure 12:
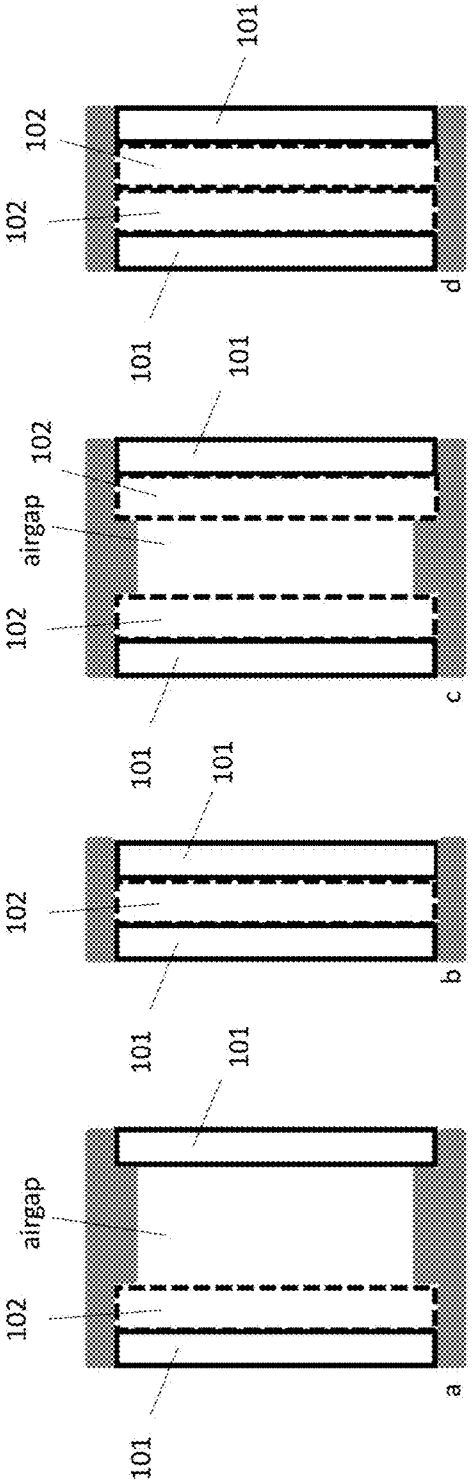

FIG. 12 illustrates four types of double pane assemblies, where the outer panes are made of glass (101) and the inner pane is a transparent and thermally insulating monolithic layer (102). Each insulating layer can be separated by an airgap of predetermined thickness (e.g., ~3-12 mm) or in contact with the glass pane. The overall stack can be held in place by spacers, adhesive and sealant (shaded). The first schematic (a) shows an assembly comprising one glass pane with an insulating layer attached to it and a second glass pane held in place with spacers and sealant to create an airgap. The second schematic (b) shows an assembly comprising a glass pane with an insulation layer attached to it and a second glass pane directly placed on the insulation layer. The overall structure does not comprise an airgap and is maintained in place with sealant and/or spacers. The third schematic (c) shows an assembly comprising two glass panes with an insulating layer attached to each of them. The two panes are held together, using spacers and sealant, in such a way that the two insulating layers are facing each other, and a permanent airgap exists between them. The last schematic (d) shows the direct assembly of two glass panes with an insulating layer attached to each of them. The two insulating layers are in contact on the inside of the assemblies. The structure does not contain an airgap and is held in place with sealant and spacers. The difference between (b) and (d) is that both glass panes had an insulating transparent layer on them before fabricating the assembly. Once finished, there may be no difference, as long as the total thickness of the insulating layer is the same.

Figure 13:
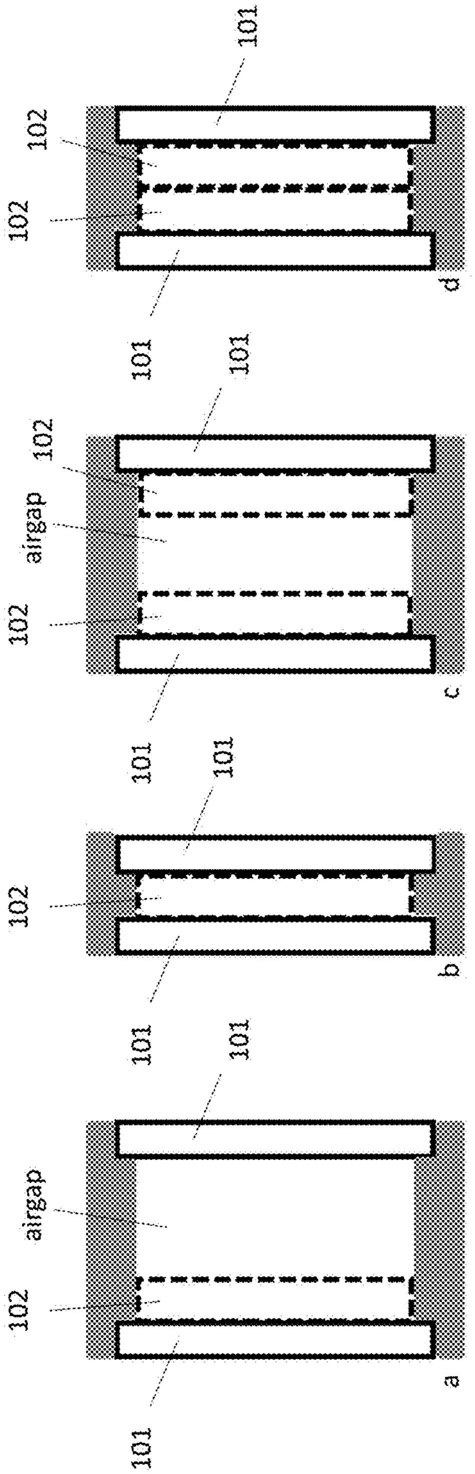

FIG. 13 illustrates additional assemblies where the spacers are between the outer panes in accordance with the disclosure.

Figure 14:
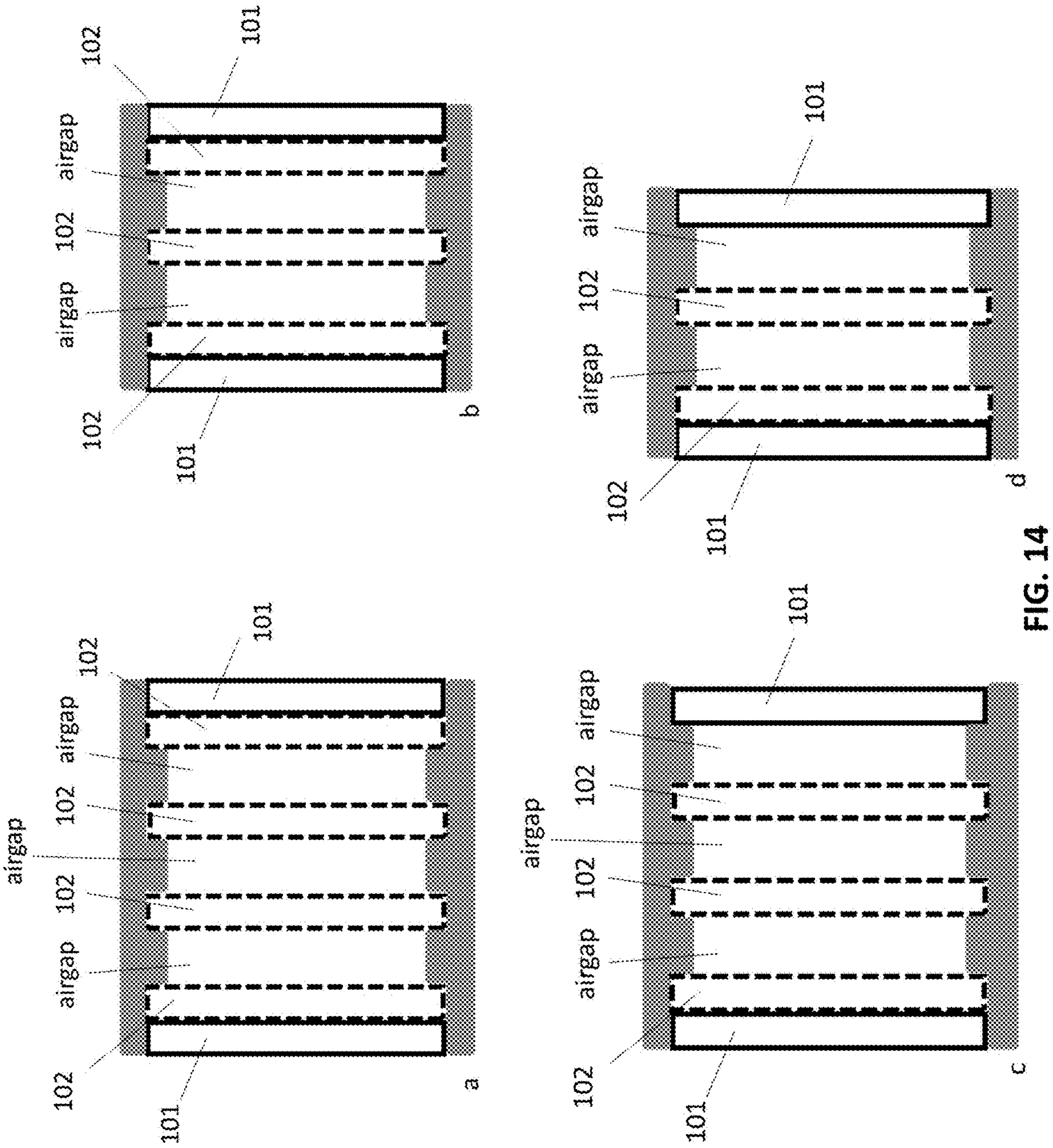

FIG. 14 illustrates hybrid IGU designs mixing self-standing insulating layer(s), airgaps and adhered insulating layer(s). a) Quadruple pane with two outer glass panes (101), each of them having one adhered insulating layer (102) on the inside facing surface and two self-standing insulating layers (102) separated with airgaps. b) Triple pane with two outer glass panes (101), each of them having one adhered insulating layer (102) on the inside facing surface and one self-standing insulating layer (102) separated with airgaps. c) Quadruple pane with two outer glass panes (101) with one of them having one adhered insulating layer (102) on the inside facing surface and two self-standing insulating layers (102) separated with airgaps. d) Triple pane with two outer glass panes (101) with one of them having one adhered insulating layer (102) on the inside facing surface and one self-standing insulating layer (102) separated with airgaps in accordance with examples of the disclosure.

Figure 15:
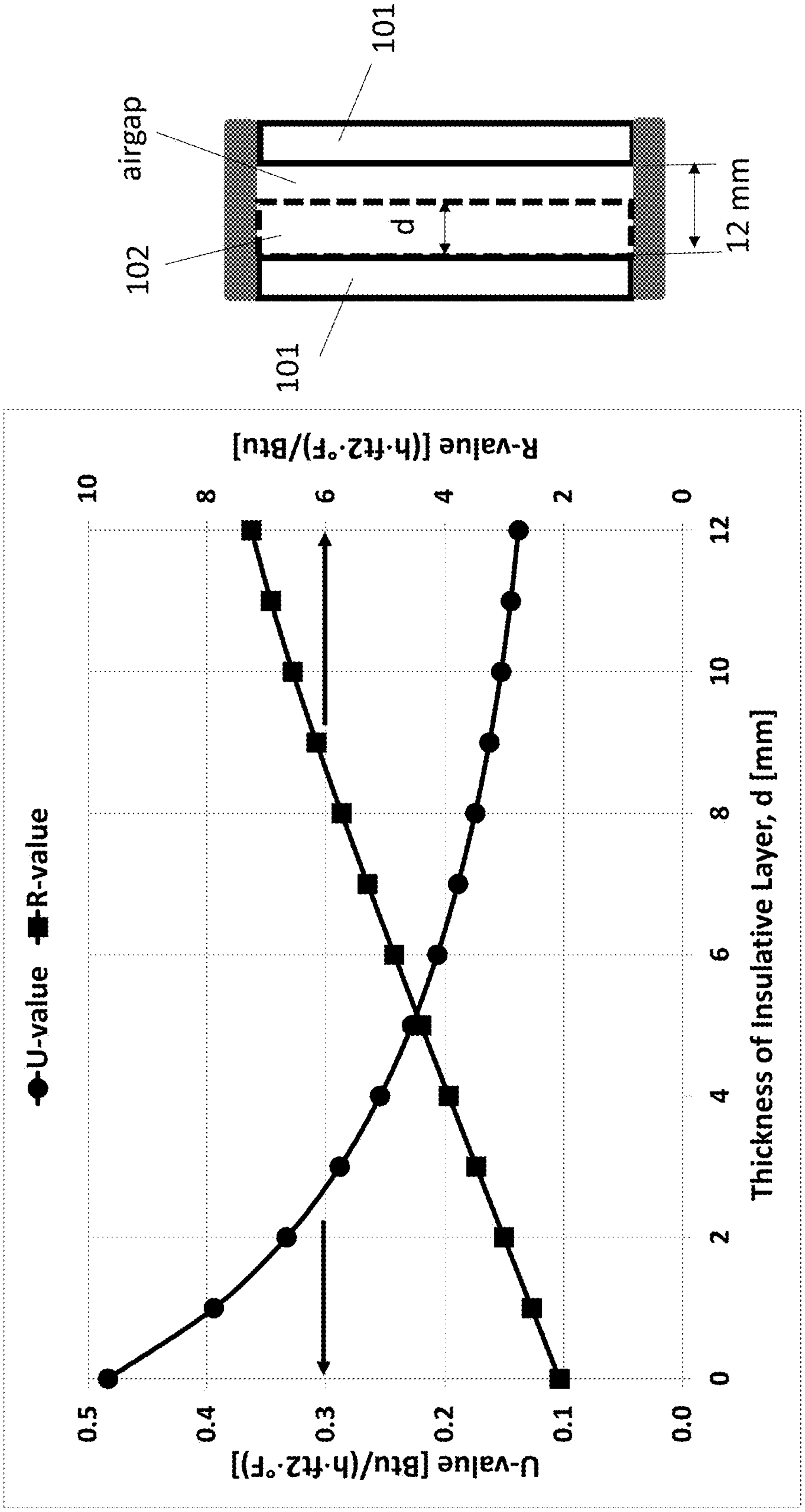

FIG. 15 illustrates calculated U value and R value for different thicknesses of insulating layers within a double pane assembly where the total gap (layer+airgap) between the outer glass pane remains constant (12 mm). The assembly is a regular double pane with a 12 mm airgap when the film thickness is equal to 0 mm. The thermal conductivity of the insulation layer used for the calculation is 11 mW/(K.m).

Figure 16:
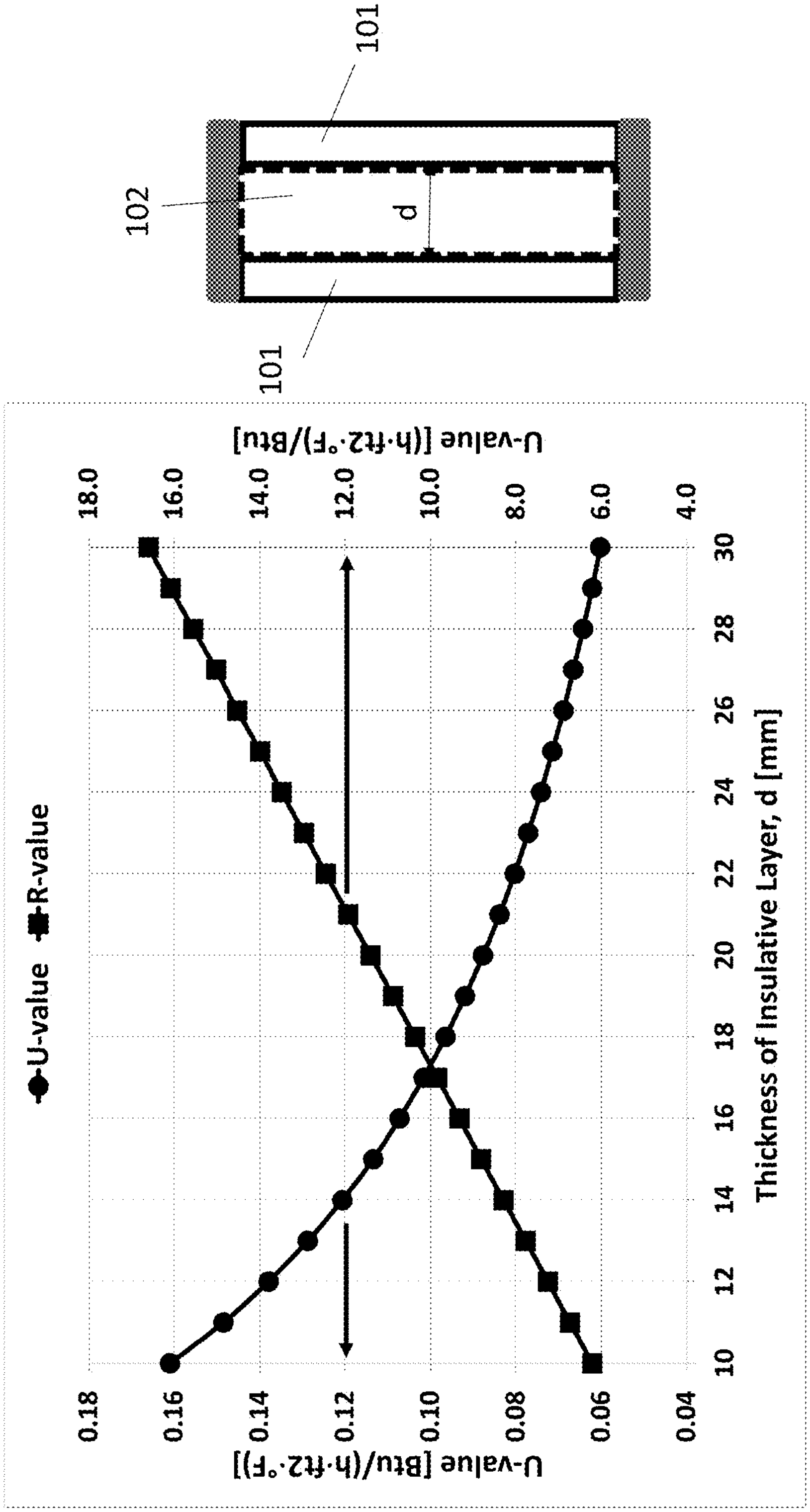

FIG. 16 illustrates calculated U value and R value for different thicknesses of insulating layers within a double pane assembly (no airgap). An example with a thickness of 25.4 mm was fabricated and an R value of 14 was measured, which corresponds well with the calculation. The thermal conductivity of the insulation layer used for the calculation is 11 mW/(K.m).

Figure 17:
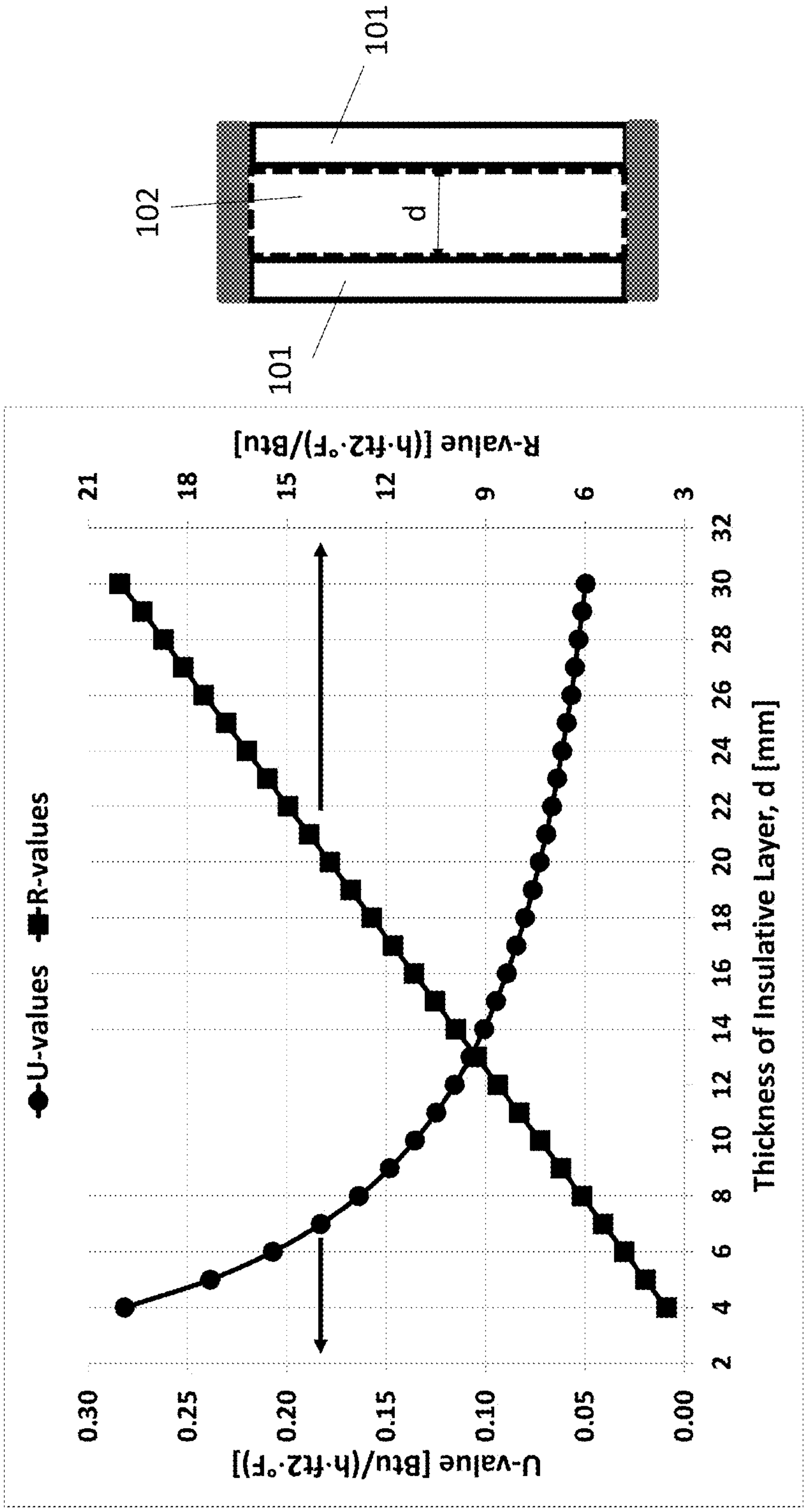

FIG. 17 illustrates calculated U value and R value for different thicknesses of insulating layers within a double pane assembly without airgap. The thermal conductivity of the insulation layer used for the calculation is 9 mW/(K.m).

Figure 18:
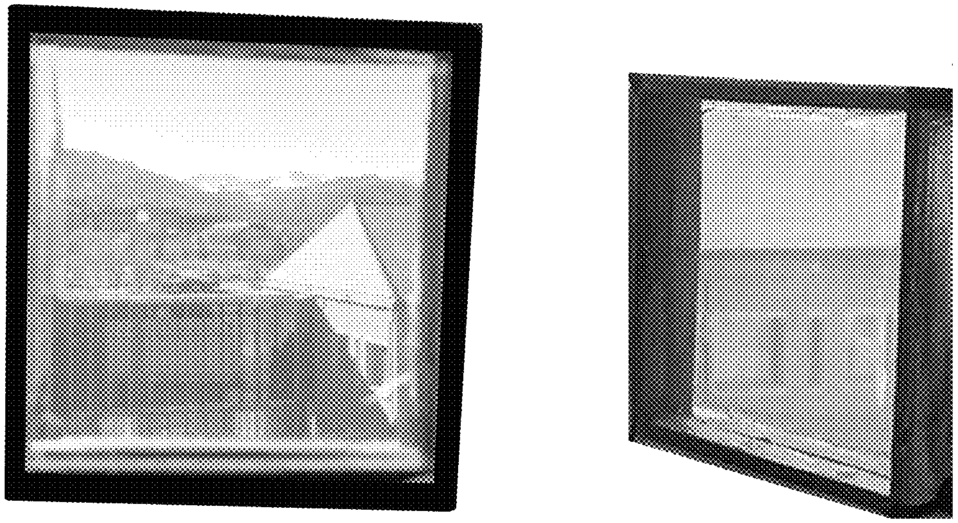

FIG. 18 illustrates pictures of a prototype assembly without airgap, with a 25 mm thick insulation layer. This figure illustrates good optical properties. The R value of the illustrated assembly was measured at R=14.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS OF THE DISCLOSURE

The description of exemplary embodiments provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

In this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings in some embodiments.

Exemplary insulated assemblies and methods are described in detail below. The examples are illustrative and the schematics illustrations are not at the actual scale and, unless otherwise noted, are not meant to limit the scope of the invention. Further, components of the exemplary assemblies can be interchanged, unless otherwise noted.

Exemplary materials suitable for use as insulating layers or mid-layers as described herein are disclosed in U.S. Publication No. US2019/0055373, filed Jun. 25, 2018, and entitled "Bacterial cellulose gels, process for producing and methods of use," and in PCT Publication No. WO2019/241604, filed Jun. 13, 2019, and entitled "Cellulosic gels, films and composites including the gels, and methods of forming same," the contents of which are hereby incorporated herein by reference, to the extent such contents do not conflict with the present disclosure. Further, although the examples below are described in connection with glass panes, the assemblies are not so limited, and other materials suitable for use as panes of materials, such as those disclosed herein, can be used.

Example of Multiple-Pane Insulated Assembly with Self-Supported Insulating Layer Examples of multi-pane insulation glass units include a first pane of material, a second pane of material, and one or more monolithic insulating layers interposed between the first pane of material and the second pane of material. An airgap can separate the one or more monolithic insulating layers (or mid-layer(s)). The mid-layers can include or consist of transparent, thermally insulating self-standing solid material, such as the insulating layers described herein.

Figure 1:
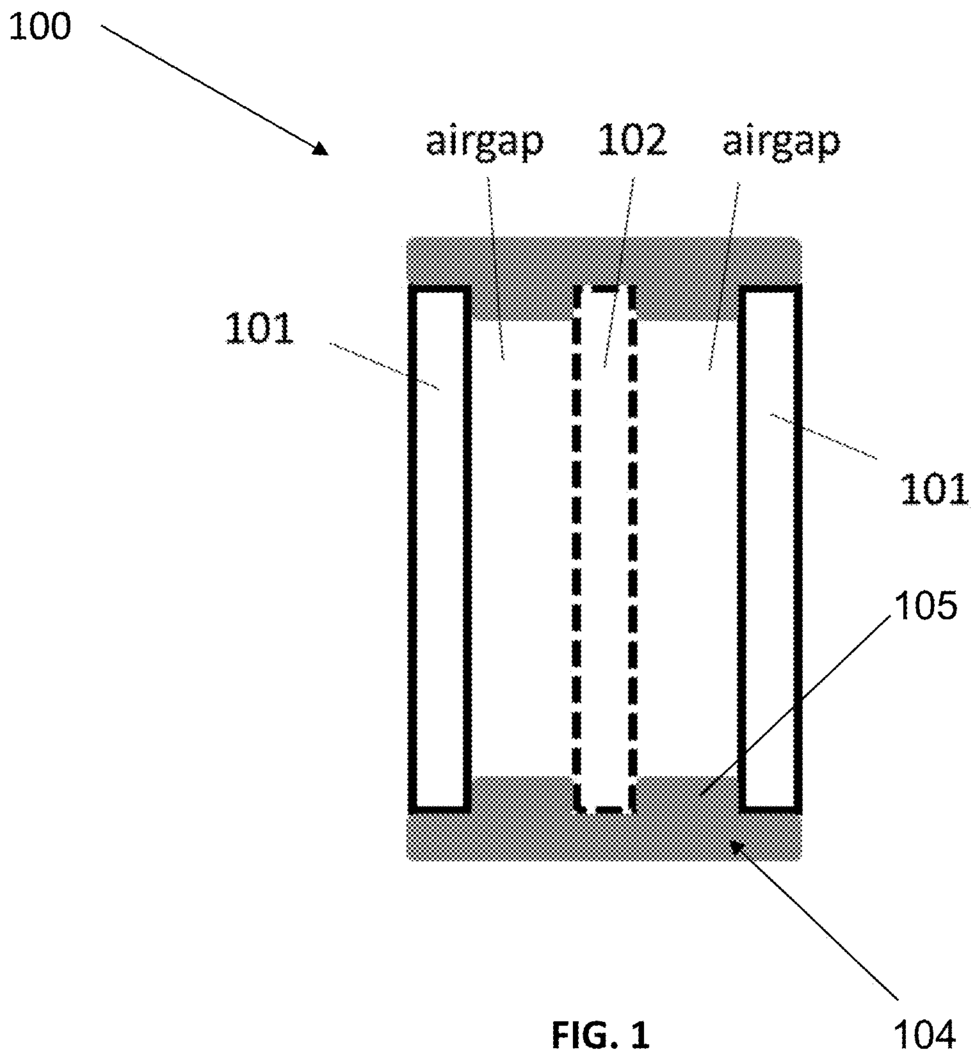
FIGS. 1 and 2 illustrate assemblies in accordance with exemplary embodiments of the disclosure.
Figure 2:
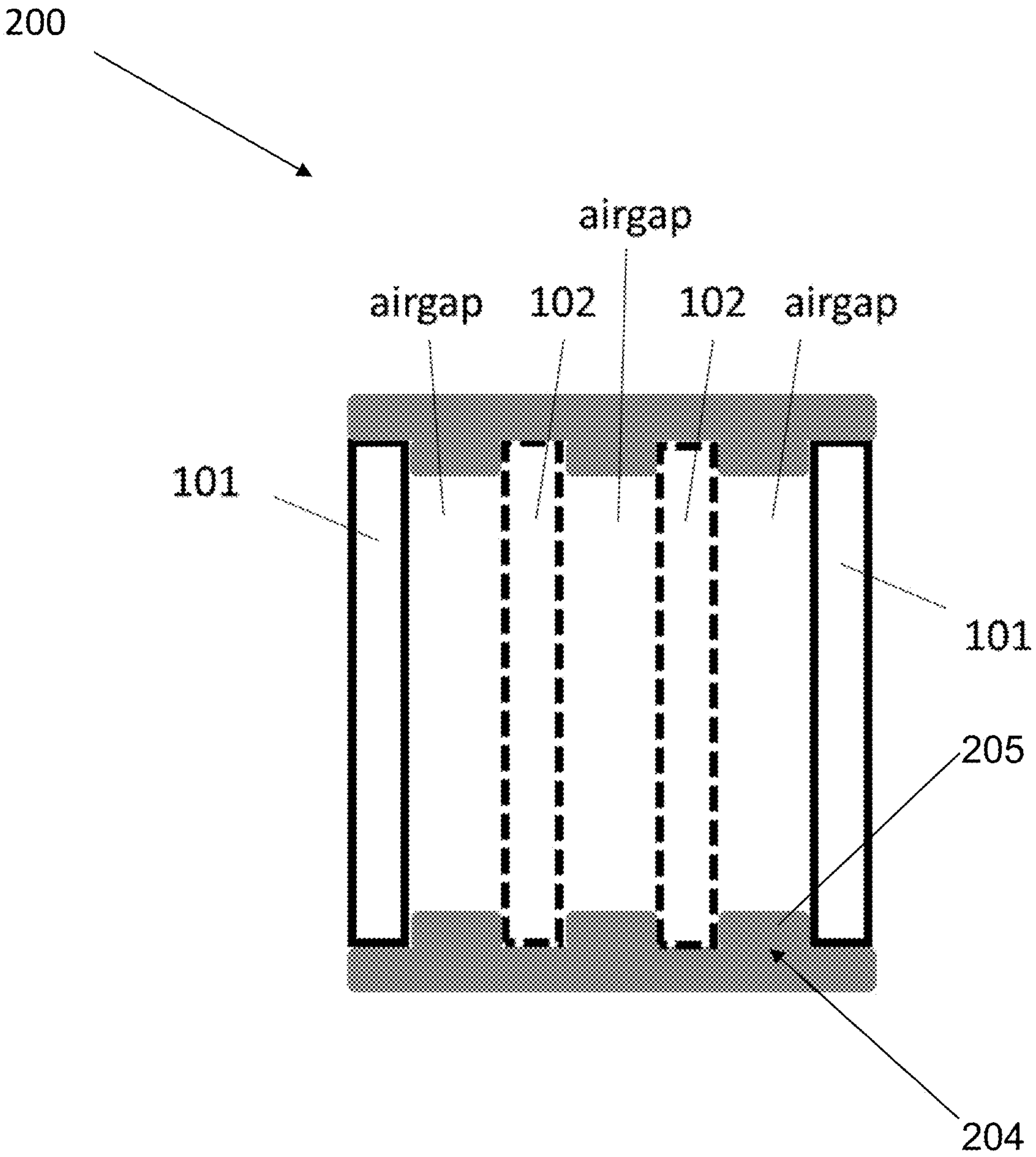

FIG. 1 illustrates an insulated assembly 100 in accordance with examples of the disclosure. Assembly 100 can include two panes of glass (101) separated with an airgap. In the middle of that airgap, a mid-layer (102) is inserted as described on the schematic of a triple pane solution (FIG. 1). Several mid-layers of that type can be inserted to further reduce the thermal conductivity, and the U-value, increasing the R-value of the IGU, as depicted in FIG. 2 for a quadruple pane system. This mid-layer (102) can be a self-standing layer that has a thermal conductivity lower than the one of air (e.g., ~26 mW/(K.m) or other value noted herein at room temperature) and is transparent or exhibits other transparency values as noted herein. Desired properties can be obtained using highly porous materials wherein both the solid content and the pores remain small compared to the wavelength of light (<50 nm, better if <20 nm). An example of such a mid-layer was measured as low as 11 mW/(K.m). Another example of such a mid-layer was measured as low as 9 mW/(K.m). By way of examples, assembly 100 can be a triple pane assembly where the outer panes are made of glass (101) and the inner pane is a transparent and thermally insulating mid-layer (102). Each layer is separated by an airgap of predetermined thickness (e.g., ~3-12 mm). The overall stack can be held in place by spacers (105, 205), adhesive and sealant and spacers are illustrated as (104, 204 shaded).

Figure 3:
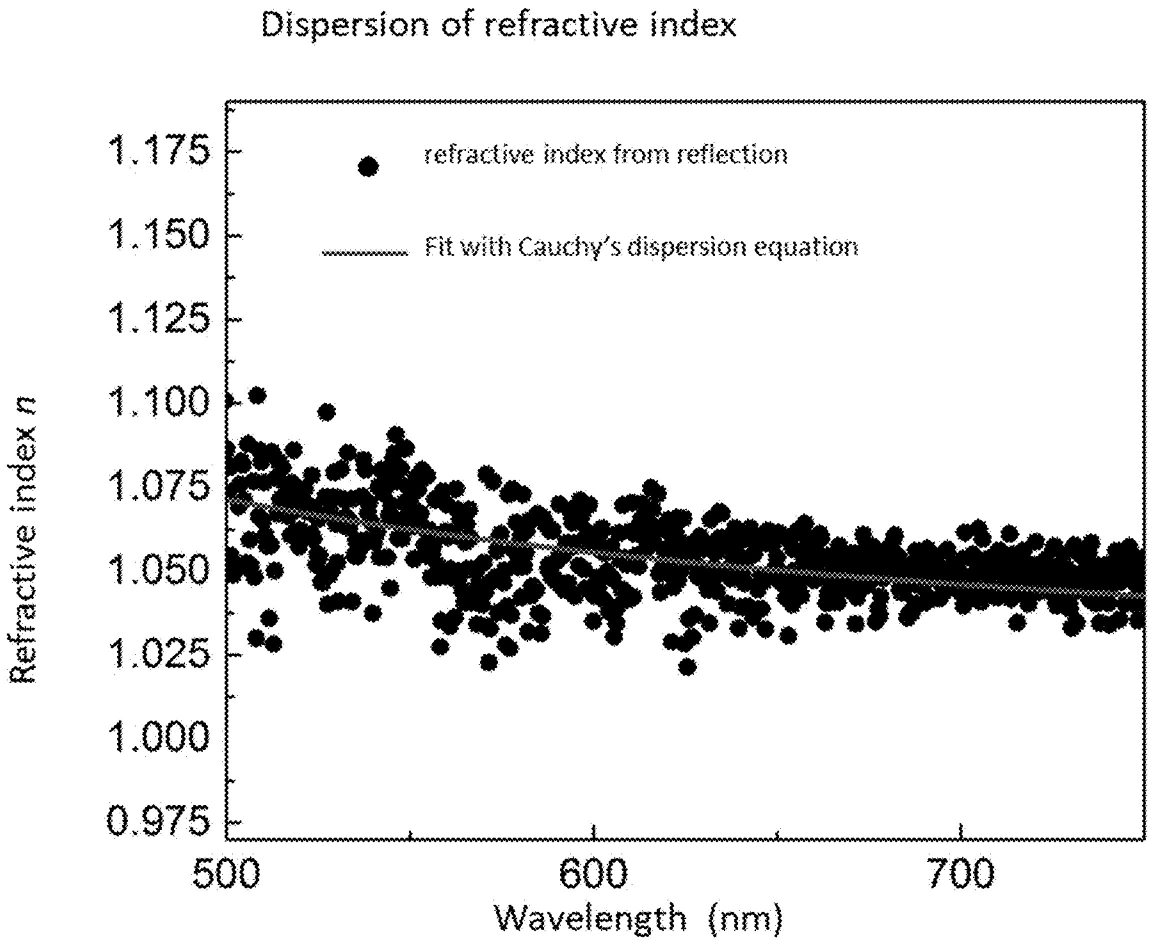
FIG. 3 illustrates refractive index measurements.

The illustrative insulated assemblies described herein allow one to create more insulative assemblies or integrated units, compared to standard (e.g., triple pane) windows, where the mid-layer is made of a common material, which is not thermally insulative, such as glass or plastic. The increase of insulation can be quantified and is directly linked to the lower thermal conductivity of the material used for the mid-layer for a given structure. In addition, the visible light transmission through this new type of assembly can be higher than common ones, as the refractive index of the mid-layer (102) can be lower than 1.5 and can be close to the refractive index of air. Refractive index values as low as n=1.04 for a highly insulative mid-layer, as described herein, were measured (FIG. 3). With these parameters, the theoretical reflection coefficient at the air/mid-layer interface is 0.04% per interface for n=1.04, whereas it is 4% per interface for regular glass (n=1.5). For a similar triple pane structure, the assemblies described herein can reduce the light loss through reflection by 8% of the total transmission, compared to a standard triple pane. For a quadruple pane assembly, the light loss is reduced by 16% of the total transmission (four interfaces).

Figure 4:
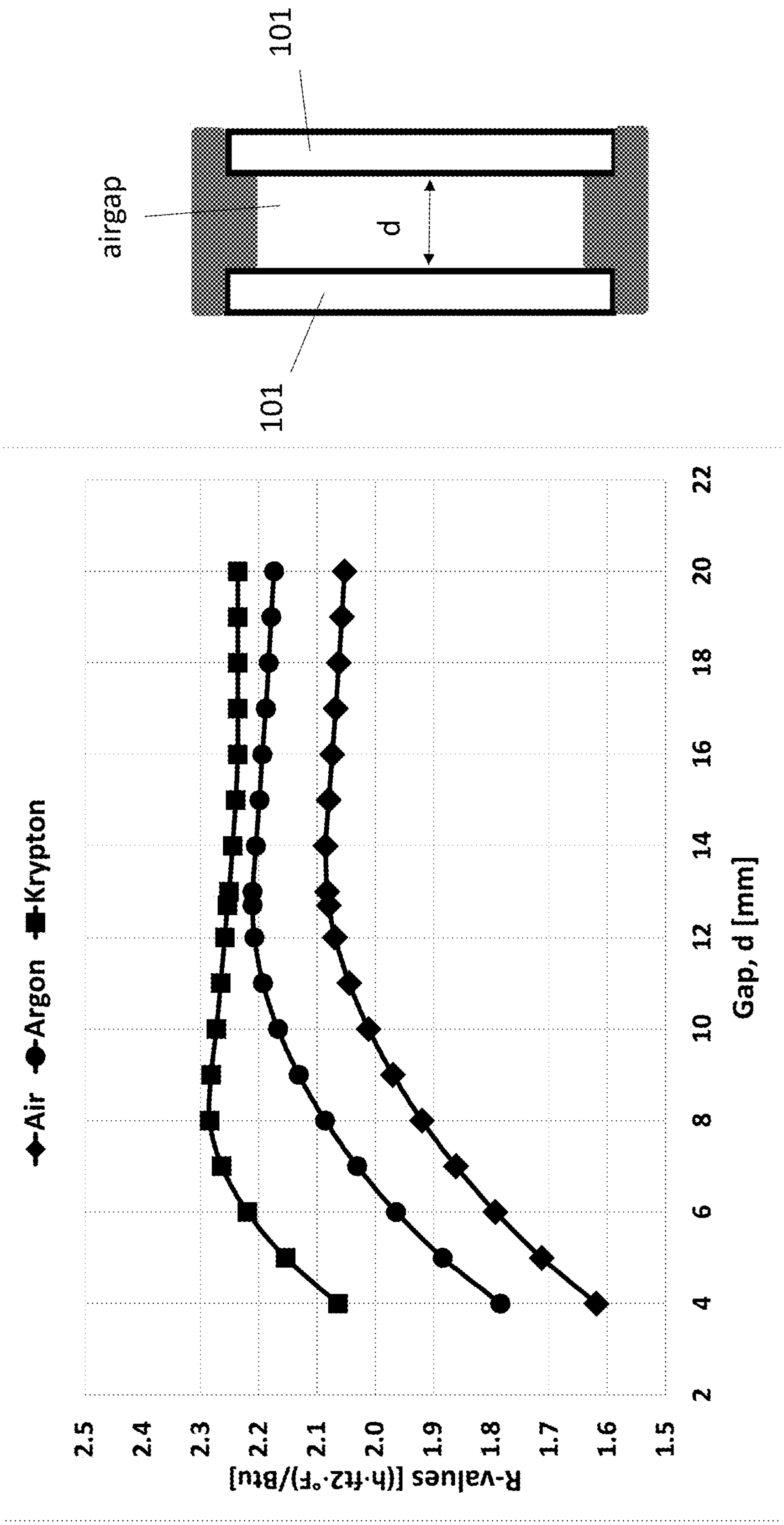
FIG. 4 illustrates a standard double pane assembly comprising two glass panes (101) on the outer part of the structure and one airgap in between whose thickness is d. Calculated R values of the standard assembly versus the thickness of the airgap for different gases (air, argon and krypton).

Each layer of an assembly can be separated by an airgap that can be several mm wide. The airgaps should remain small to limit thermal loss through convection (<16 mm, <12 mm, <10 mm, or the like). The optimal thickness of the airgap can vary between about 8 and 14 mm, or about 6 and 16 mm. The type of gas and the temperature of use are example of parameters affecting the optimal thickness of the airgap. Calculations similar to the example given in FIG. 4 allows designing the desired assembly. Although, other parameters can be taken into account, such as mechanical robustness and soundness.

As an example, a triple pane structure made from ~3 mm thick glass panes, ~3 mm thick mid-layer and ~13 mm airgaps would measure ~35 mm. The R value of such assembly range from 5 to 8 with varying gas filling the airgap is illustrated in FIG. 5. This construction is wider than a standard double pane IGU but it works with specific frames, such as the one for triple pane windows. The overall thickness can be a limiting factor, especially when the window is expected to be mounted on an old building, due to issues with framing compatibility (both dimension and weight of the window). This can limit overall the thermal insulation properties of a traditional assembly.

Thinner assemblies can be made by reducing the airgap thickness to ~6 mm. Using similar thicknesses of ~3 mm for the outer panes and the insulating mid-layer, one triple pane assembly can be as thin as ~21 mm. The thickness of this example is similar to a standard double pane assembly and can replace one but provide much higher thermal insulation. Calculation of R value with varying gas filling the airgap is illustrated in FIG. 6. When filled with krypton, this assembly is particularly interesting as the gap is close to its optimum (see FIG. 4).

Thicker glass panes can be used for large assemblies. However, deflection of the glass pane due to temperature and pressure difference between outside and inside the assembly can put a high load on a seal. To prevent failure of the seal, the airgap can be limited to a safe thickness, depending on the glass pane thickness. An example is to limit the airgaps to ~8 mm when ~6 mm thick glass panes are used for a 40 square foot assembly.

The glass panes can be low-emissivity glass panes or not. A low-E coating can be on or applied to any and all surfaces of the glass panes. If only one glass pane surface is low-E coated, the preferred surface is facing inside on the exterior glass pane, namely surface 2 in the window industry.

The glass panes can bear active coatings or systems, such as but not limited to electrochromic system(s), to control solar heat gain. The active coating can be in addition to the low-E coating or instead of it.

The transparent insulating mid-layer (102) can be porous to air so that there is no need to have a specific hole in it to equilibrate the air pressure between the different airgaps. If the transparent insulating mid-layer (102) is not porous to air, hole(s) can be formed within the insulating mid-layer to equilibrate the pressure between the airgaps.

More mid-layers can be inserted for quadruple pane solutions/assemblies 200 (FIG. 2), etc. The advantage here is that the light transmission does not decrease much, or at all, through reflective losses as more panes are added because of low refractive indices of the mid-layers. Structure with more mid-layers (5, 6 . . . 10) can be formed to further increase the insulation. For example, the number of mid-layers used can be two for a quadruple pane structure as illustrated in FIG. 2. This may be sufficient in many cases, as it is advised to have windows less insulative than walls in a building to prevent condensation inside the walls in humid regions. In the future, higher R-value windows may be desired and can be obtained using assemblies described herein using more mid-layers. FIG. 7 shows a quintuple pane design and calculated thermal properties are given in FIG. 8 with varying gas filling the airgap. R values between 10 and 15 are obtained.

To be compatible with transparent window application, the haze value of the structure should be below 3%. The clarity of a window can be one of the most important properties of a window and haze below 2% can be desired for high-end transparent windows. This may desirably be taken into account in the design of assemblies if the insulation layer has a significant haze value. For both our triple pane and quadruple pane window prototypes, we could obtain a haze value of 2% or less.

Non-fully transparent assemblies may be desirable for, for example, skylight applications where ambiance light is appreciated, or for privacy windows. In that case, haze values of the assemblies may be desirably higher.

Components of a structure (e.g., an insulation unit) can be held in place with spacers, sealant and a frame surrounding the insulation unit. Various materials can be used for such components, such as steel, aluminum, rubber, etc.

An example of a triple pane insulated assembly 900 comprising one mid-layer and a frame 902 is illustrated in FIG. 9. This sample comprises two ⅛" thick glass panes. One of these has a low-E coating. The mid-layer is ⅛" thick and the two airgaps are 3/16" thick. The total thickness of the prototype is 9/16." The U-value measured for this sample is 0.185 BTU/sf/F/hr (R=5.4). It was computed from the heat flow measured across our prototype under a temperature gradient (FIG. 10). This value can be further improved by having different airgaps and/or a thicker mid-layer. In the illustrated example, the haze value is about 2% and the total transmission in the visible spectrum is about 73% (FIG. 11). As a comparison, the total transmission of a reference triple pane assembly comprising three panes of glass, with one having a low-E coating, with ½" airgaps separating them, is shown as a lower line. The outer panes for both the prototype and the reference are the same. The mid-layer for the reference is a regular glass pane, the same as the non-low-E coated outer pane of both the prototype assembly and the reference. Average light transmission in the visible spectrum is measured at 73% for the prototype triple pane assembly and 67% for the reference triple pane assembly (FIG. 11). The higher transmission is due to the reduced reflection at the air/mid-layer interface thanks to a lower refractive index of the insulating layer(s). As described previously, the reflection at the interfaces of the extra pane of glass reduces the transmission by about 4% in the illustrative example. From 73% of total transmission, the extra pane reduces the transmission to 73*(1−0.04)*(1−0.04)=67%, which is in agreement with the measurements illustrated in FIG. 11.

Examples of Double Pane IGU with Monolithic Insulative Mid-Layer

The Examples below relate to double-pane insulation assemblies that include a monolithic (e.g., mesoporous) insulative layer. The monolith can include or consist of thermally-insulative self-standing solid material. The insulative layer can include or exhibit the insulative material properties (e.g., thermal conductivity, refractive index, transmission, and the like) as described herein.

The insulation glass unit comprises two panes of glass (101) and one or several insulating layer(s) in between. To help with the streamlining of the production, the insulating layer can be grown directly on one pane of material using anchoring molecules or treatment, such as those described herein. The assembly can then be fabricated in different ways described in connection with FIG. 12. If only one pane of material has an insulative layer, the second pane of material can be placed either directly onto the insulative layer or maintained at a distance using spacers and sealant so that an airgap remains present in the assembly. If both panes have an insulation layer grown on top of them, the assembly can also be made by contacting the two insulating layers or leaving an airgap in between the two insulating layers. This leads to four different types of double assemblies, which are all illustrated in FIG. 12. The overall structure is held in place with spacers, sealant and optionally a frame surrounding the assembly. Different materials can be used, such as steel, aluminum, rubber, etc. Spacers can define and maintain the airgap in the assembly. Similar designs, where the spacers are between the outer panes, are illustrated in FIG. 13. For the assemblies illustrated in FIG. 13, the spacer has a total thickness similar (e.g., within 10%) to the insulative layer and the airgap, if any.

Additional assemblies and IGUs mixing self-standing insulative mid-layers and insulating layers adhered on the outer glass panes are described in connection with FIG. 14. The adhered insulating layers can either be placed on a pane of material (e.g., glass) or directly fabricated on the pane. The insulating layers can face toward the inside of the assembly/IGU. Only one of the outer glass panes or both can have an insulating layer added for these additional designs. With or without an adhered insulating layer, the outer panes can be treated similarly to fabricate triple or quadruple pane assemblies/IGUs. The overall structure alternating airgaps and self-standing insulative mid-layers is similar between the designs of FIGS. 1, 2 and 14. These designs can also be fabricated with more insulating mid-layers to achieve 5-10, or virtually any number panes assemblies/IGUs.

As described above, the insulating layer can have a thermal conductivity lower than the thermal conductivity of air (~26 mW/(K.m) at room temperature) and no convective transfer, allowing a better insulation per mm (thickness) than a regular double pane window with an airgap. The insulative layer can be transparent and with low haze for most window applications, or can scatter light by design for some skylight and privacy windows, for example. These properties can be obtained using highly-porous materials, wherein both the solid content and the pores remain small compared to the wavelength of light (<50 nm or <20 nm). An example of such mid-layer has a thermal conductivity that measured as low as 11 mW/(K.m), or as low as 9 mW/(K.m).

The illustrated structure allows one to create more insulative assemblies than standard double pane windows, because the insulative layer outperforms an airgap. The increase of insulation can be quantified for a given structure and can be directly linked to the lower thermal conductivity of the material used for the mid-layer and the insignificant convection within the mid-layer. The assembly can be made thinner for the same insulation properties as regular double pane IGU or more insulative for the same thickness. The former can be useful when one wants to replace a single pane with an assembly—e.g., in old buildings or historical landmarks. The assemblies can also be made thicker than a regular double pane window, providing thus even higher insulation properties. Standard double pane windows have a limitation in the airgap thickness to prevent gas convection within the gap. If the gap is too large (FIG. 4), the IGU is not insulating optimally because of thermal loss through gas convection. When using a transparent solid insulating material as described herein in place of the airgap, there is no limit in thickness as no or extremely low air convection occurs.

From the thickness of the insulating layer and its thermal conductivity, the overall insulation properties of the assembly can be calculated. In FIG. 15, the calculated U value and R value are indicated for assemblies where the insulating layer thickness is varied from 0 to 12 mm. The airgap is systematically varied as the total thickness is maintained constant (12 mm). In FIG. 16, the calculated U value and R value are indicated for assemblies without an airgap. The double pane is filled with an insulating layer of varying thickness between 10 mm and 30 mm, achieving R values of ~6 and ~16, respectively, when the thermal conductivity of the insulative material is 11 mW/(K.m). In FIG. 17, the calculated U value and R value are indicated for similar assemblies without an airgap, wherein the insulating layer thickness is varied from 4 mm to 30 mm, using a thermal conductivity of 9 mW/(K.m) for the insulative material.

One double pane assembly with two ⅛" thick glass panes with a one-inch thick (25.4 mm) insulating layer in between without any airgap is illustrated in FIG. 18. The total thickness of the assembly was ~32 mm. The thermal properties of the prototype were measured at R~14 (U=0.07 BTU/sf/F/h). This measurement corresponds well with the calculation in FIG. 16 (R~14).

The glass panes can be low emissivity glass panes or not. The low-E coating can be on any and all surfaces of the glass panes. If only one glass pane surface is low-E coated, the preferred surface is facing inside on the exterior glass pane; namely, surface 2 in the window industry.

For highly insulative assemblies (e.g., R>9) comprising an insulating mid-layer and no airgap, the low-E coating did not further increase the thermal insulation. Thus, in accordance with examples of the disclosure, assemblies with R values greater than 9 do not include a Low-E coating. Calculation for assemblies comprising two generic 3 mm glass panes and one insulating layer in between showed R-values of 9, 10 and 65 for 12.7 mm, 14.2 mm and 100 mm thick insulating layers, respectively.

The absence of low-E coating on the insulative assembly yield a higher light transmission which can be well appreciated in winter, and at higher latitudes.

To be compatible with transparent window application, the haze value of the structure should be below 3%. The clarity of a window can be one of the more important properties of a window and haze below 2% may be desired for high-end transparent windows. This can be taken into account in the design of these new assemblies if the insulating layer has a significant haze value. For exemplary double pane windows, haze values of 2% were obtained; other haze values are in accordance with other examples of the disclosure.

As noted above, non-fully transparent assemblies may be desired for skylight applications, where the ambient light is appreciated, or for privacy windows. In that case, haze values of the assembly may be desirably higher to prevent seeing through the window.

A technological advantage for all these designs is that the insulating layer can be directly fabricated on a glass pane that will be used in the assembly. In doing so, the handling steps on the production line are reduced and a traditional assembly chain can be swiftly adapted to make the improved assemblies.

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to the embodiments shown and described herein, such as alternative useful combinations of the elements described, may become apparent to those skilled in the art from the description. Such modifications and embodiments are also intended to fall within the scope of the appended claims.

We claim:

1. An insulated assembly comprising:
- a first pane of material;
- a second pane of material;
- one or more monolithic insulating layers interposed between the first pane of material and the second pane of material, the insulating layer comprising cellulose and having a thermal conductivity less than 26 mW/(K·m);
- a first gap between at least one of the one or more monolithic insulating layers and at least one of the first pane of material and the second pane of material; and
- an active coating on one or more of the first pane and the second pane,
- wherein at least one of the one or more monolithic insulating layers is greater than 90% transparent to light in the visible spectrum.

2. The insulated assembly of claim 1, comprising the active coating on the first pane and on the second pane.

3. The insulated assembly of claim 1, wherein a refractive index of at least one of the one or more monolithic insulating layers is less than 1.5.

4. The insulated assembly of claim 1, further comprising a second gap between the at least one of the one or more monolithic insulating layers and at least one of the first pane of material and the second pane of material.

5. The insulated assembly of claim 1, further comprising a coating on one or at least one of the first pane of material and the second pane of material to reduce emissivity of the insulated assembly.

6. The insulated assembly of claim 1, further comprising a gas within the first gap.

7. The insulated assembly of claim 1, wherein at least one of the one or more monolithic insulating layers comprises mesoporous material exhibiting pore sizes less than 100 nanometers.

8. The insulated assembly of claim 1, wherein at least one of the one or more monolithic insulating layers is not directly attached to the first pane of material or the second pane of material.

9. The insulated assembly of claim 1, wherein a haze value of the insulated assembly is less than 5%.

10. The insulated assembly of claim 1, wherein an average transmission of light in the visible spectrum is greater than 73%.

11. The insulated assembly of claim 1, further comprising one or more spacers between the first pane of material and the second pane of material.

12. The insulated assembly of claim 1, further comprising a frame about a perimeter of the first pane of material and the second pane of material and a sealant between the first pane of material and the second pane of material.

13. The insulated assembly of claim 1, wherein at least one of the one or more monolithic insulating layers is a self-supporting layer that directly contacts at least one of the first pane of material and the second pane of material.

14. The insulated assembly of claim 1, comprising two or more monolithic insulating layers and a gap between at least two of the two or more monolithic insulating layers in a direction spanning between the first pane of material and the second pane of material.

15. An insulation unit comprising an insulated assembly of claim 1.

16. A method of forming an insulated assembly, the method comprising the steps of:
- providing a first pane of material;
- forming a first cellulose-based monolithic insulating layer directly on a surface of the first pane of material;
- providing a second pane of material; and
- treating a surface of the first pane of material prior to forming the first cellulose-based monolithic insulating layer on the surface of the first pane of material, wherein the step of treating comprises plasma treatment, etching using a basic solution, etching using an acidic solution, or any combination thereof,
- wherein a gap is formed between the first cellulose-based monolithic insulating layer and the second pane of material,
- wherein the insulated assembly comprises the first cellulose-based monolithic insulating layer between the first pane of material and the second pane of material,
- wherein a thermal conductivity of the insulated assembly is less than 26 mW/((K·m), and
- wherein the insulated assembly is greater than 66% transparent to light in the visible spectrum.

17. The method of claim 16, wherein the step of treating comprises plasma treatment.

18. The method of claim 16, further comprising a step of forming a second cellulose-based monolithic insulating layer directly on a surface of the second pane of material.

19. A method of forming an insulated assembly, the method comprising the steps of:

providing a first pane of material;

forming a first cellulose-based monolithic insulating layer directly on a surface of the first pane of material;

providing a second pane of material; and providing coupling molecules comprising a silane or silanol derivative containing one or more reactive groups selected from amines, epoxides, carboxylic acids, cyanates, or isocyanates on one or more of the surface of the first pane of material and the surface of the second pane of material, wherein a gap is formed between the first cellulose-based monolithic insulating layer and the second pane of material, wherein the insulated assembly comprises the first cellulose-based monolithic insulating layer between the first pane of material and the second pane of material, wherein a thermal conductivity of the insulated assembly is less than 26 mW/((K·m), and wherein the insulated assembly is greater than 66% transparent to light in the visible spectrum.

20. A method of forming an insulated assembly, the method comprising the steps of:

providing a first pane of material;

forming a first cellulose-based monolithic insulating layer directly on a surface of the first pane of material;

providing a second pane of material; and providing one or more spacers to form a gap between the first cellulose-based monolithic insulating layer and a second cellulose-based monolithic insulating layer, wherein the insulated assembly comprises the first cellulose-based monolithic insulating layer between the first pane of material and the second pane of material, wherein a thermal conductivity of the insulated assembly is less than 26 mW/((K·m), and wherein the insulated assembly is greater than 66% transparent to light in the visible spectrum.

* * * * *